(12) United States Patent
Bowers

(10) Patent No.: US 7,775,551 B2
(45) Date of Patent: Aug. 17, 2010

(54) INFLATABLE PROTECTION DEVICE WITH MANIFOLD

(75) Inventor: Paul A. Bowers, Ray, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 1021 days.

(21) Appl. No.: 11/268,894

(22) Filed: Nov. 8, 2005

(65) Prior Publication Data

US 2007/0102904 A1    May 10, 2007

(51) Int. Cl.
    *B60R 21/16* (2006.01)
(52) U.S. Cl. .......... 280/729; 280/730.2; 280/749
(58) Field of Classification Search .......... 280/730.2, 280/729, 749, 743.1, 742, 740; 180/740
    See application file for complete search history.

(56) References Cited

U.S. PATENT DOCUMENTS

| | | | |
|---|---|---|---|
| 5,240,283 A * | 8/1993 | Kishi et al. ............ | 280/729 |
| 5,788,270 A | 8/1998 | Haland et al. | |
| 5,865,462 A | 2/1999 | Robins et al. | |
| 5,899,491 A | 5/1999 | Tschaeschke | |
| 6,010,149 A | 1/2000 | Riedel et al. | |
| 6,237,937 B1 * | 5/2001 | Kokeguchi et al. ........ | 280/730.2 |
| 6,293,581 B1 | 9/2001 | Saita et al. | |
| 6,394,487 B1 * | 5/2002 | Heudorfer et al. ........... | 280/729 |
| 6,431,590 B1 | 8/2002 | Bakhsh et al. | |
| 6,502,853 B2 * | 1/2003 | Keshavaraj ............... | 280/729 |
| 6,585,293 B2 * | 7/2003 | Keshavaraj ............... | 280/743.1 |
| 6,705,640 B2 * | 3/2004 | Takahashi ............... | 280/730.2 |
| 6,811,184 B2 * | 11/2004 | Ikeda et al. ............... | 280/742 |
| 6,962,364 B2 * | 11/2005 | Ju et al. ............... | 280/730.2 |
| 2002/0096863 A1 * | 7/2002 | Tanase et al. ............ | 280/730.2 |
| 2004/0188987 A1 * | 9/2004 | Salmo et al. ............... | 280/729 |

* cited by examiner

*Primary Examiner*—Eric Culbreth
(74) *Attorney, Agent, or Firm*—Tarolli, Sundheim, Covell & Tummino LLP

(57) ABSTRACT

An apparatus (10) for helping to protect an occupant of a vehicle (12) includes an inflatable vehicle occupant protection device (14). The protection device (14) includes panels (40 and 42) and a plurality of chambers (54) at least partially defined by the panels. An inflation fluid source (24) is actuatable to provide inflation fluid for inflating the protection device (14). The protection device (14) further includes a manifold (100) at least partially defined by the overlying panels (40 and 42). The manifold (100) includes a plenum portion (102) for receiving inflation fluid from the inflation fluid source and duct portions (104) that branch from the plenum portion and distribute inflation fluid into the chambers (54).

25 Claims, 4 Drawing Sheets

INFLATABLE PROTECTION DEVICE WITH MANIFOLD

FIELD OF THE INVENTION

The present invention relates to an inflatable vehicle occupant protection device for helping to protect an occupant of a vehicle.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain. Inflatable curtains inflate away from the roof of the vehicle downward inside the passenger compartment between a vehicle occupant and the side structure of the vehicle in the event of a side impact, a rollover, or both. A known inflatable curtain is inflated from a deflated condition by inflation fluid directed to the inflatable curtain from an inflator.

SUMMARY OF THE INVENTION

The present invention relates to an apparatus for helping to protect an occupant of a vehicle. The apparatus includes an inflatable vehicle occupant protection device. The protection device includes overlying panels and a plurality of chambers at least partially defined by the panels. An inflation fluid source is actuatable to provide inflation fluid for inflating the protection device. The protection device further includes a manifold at least partially defined by the overlying panels. The manifold includes a plenum portion for receiving inflation fluid from the inflation fluid source and duct portions that branch from the plenum portion and distribute inflation fluid into the chambers.

The present invention also relates to an apparatus that includes an inflatable vehicle occupant protection device inflatable to help protect an occupant of a vehicle. The apparatus also includes an inflation fluid source actuatable to provide inflation fluid for inflating the protection device. The protection device includes inflatable chambers and a manifold for delivering inflation fluid to the inflatable chambers. The manifold includes a plenum portion positioned outside the chambers and duct portions that branch from the plenum portion and extend into the chambers.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
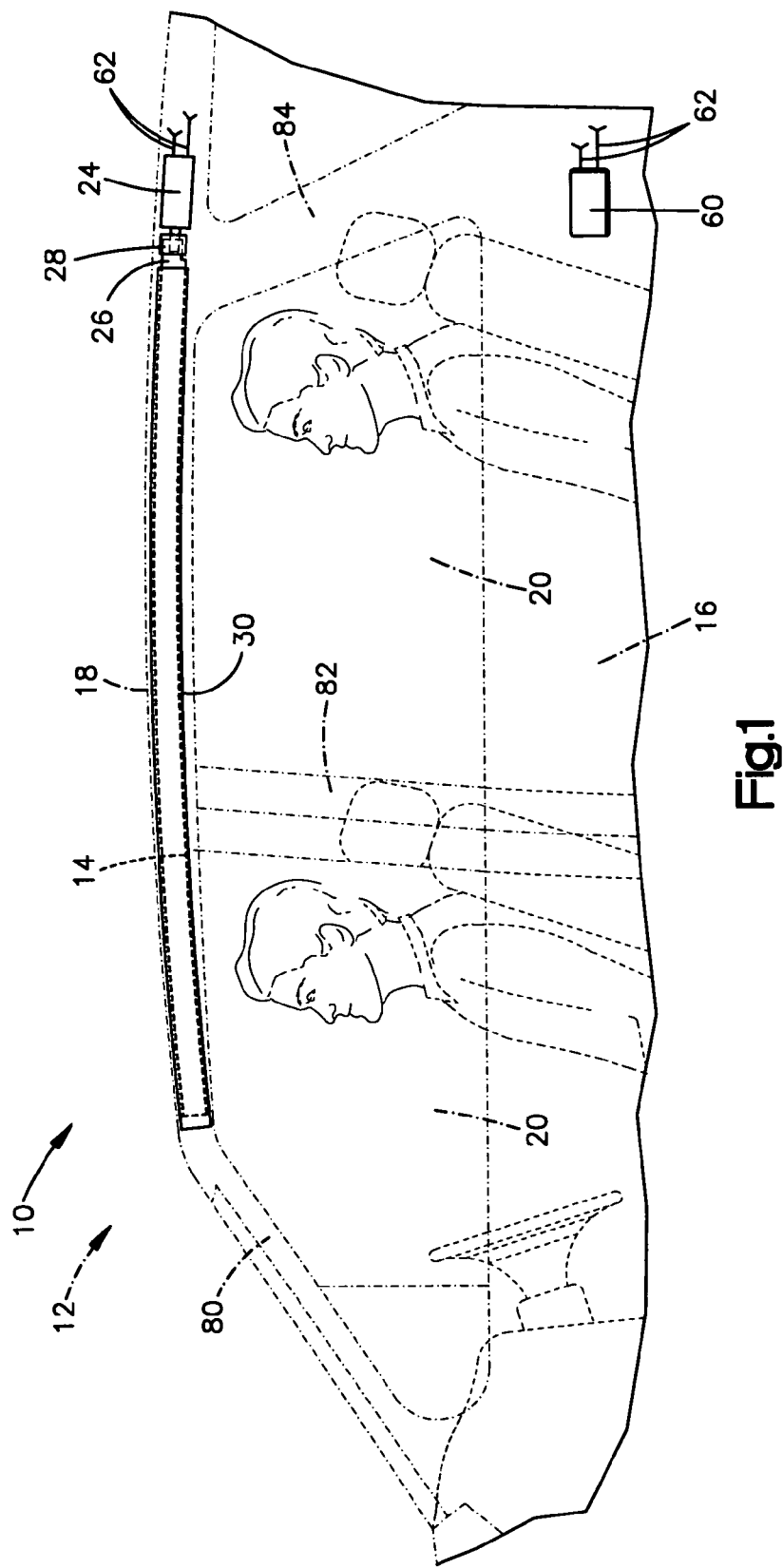
FIG. 1 is a schematic view of an apparatus for helping to protect an occupant of a vehicle illustrating a deflated and stored position of the protection device, according to a first embodiment of the present invention.
Figure 2:
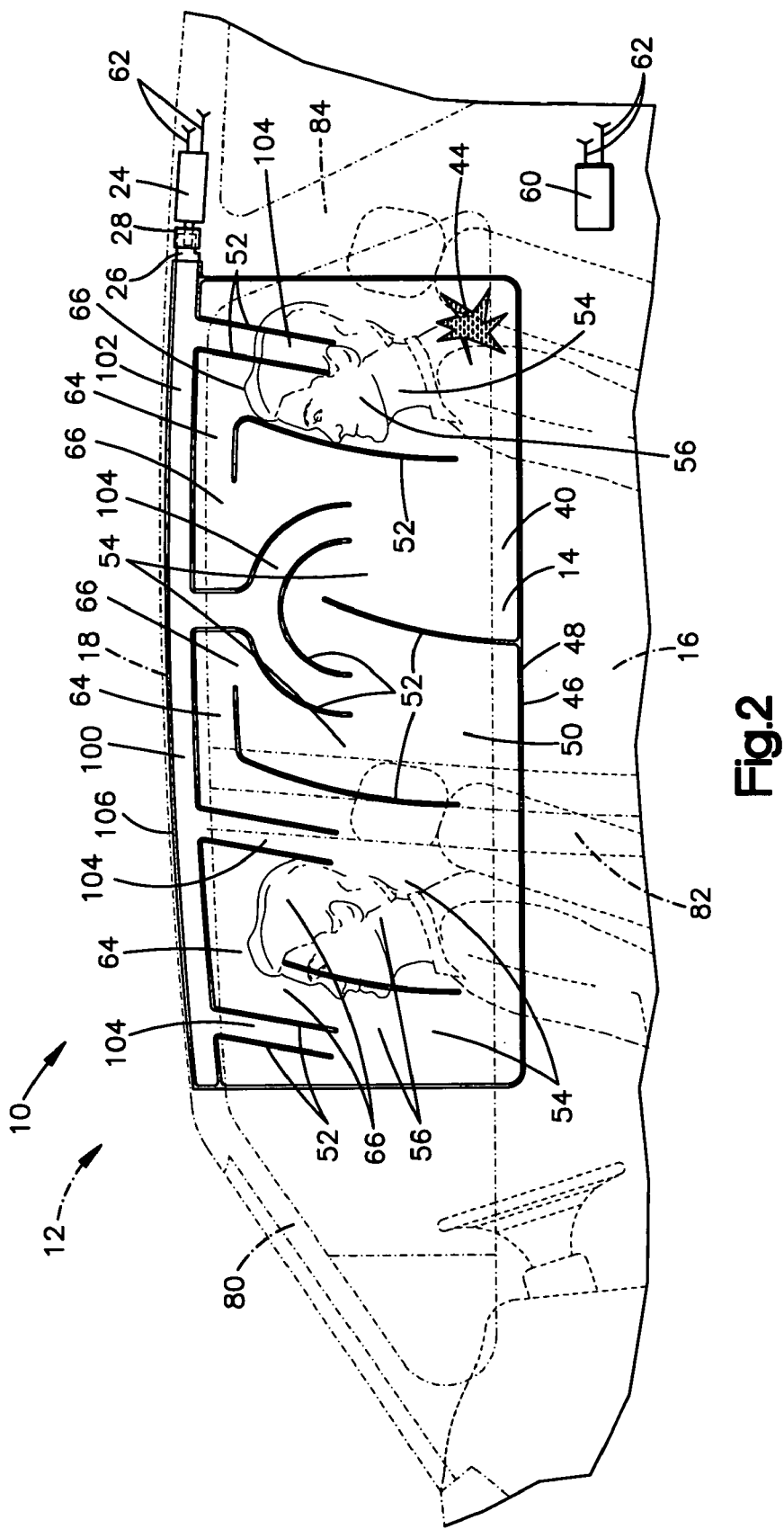
FIG. 2 is a schematic view the apparatus illustrating an inflated and deployed position of the protection device.

As representative of the present invention, an apparatus 10 helps to protect an occupant of a vehicle 12. As shown in FIGS. 1 and 2, according to a first embodiment of the invention, the apparatus 10 includes an inflatable vehicle occupant protection device in the form of an inflatable curtain 14 that is mounted adjacent the side structure 16 of the vehicle 12 and a roof 18 of the vehicle. The roof 18 may be either a standard roof that is fixed in place or a convertible roof that can be moved or removed. The side structure 16 of the vehicle 12 includes side windows 20. An inflator 24 is connected in fluid communication with the inflatable curtain 14.

The inflatable curtain 14 has an inlet portion 26 connected to the inflator 24 by means 28, such as a clamp. The inflator 24 is actuatable to inflate the inflatable curtain 14 from a deflated and stored position shown in FIG. 1 to an inflated and deployed position shown in FIG. 2. The inflator 24, the inflatable curtain 14, or both, may be configured to maintain the inflatable curtain 14 in the inflated and deployed condition for a desired duration, such as at least two seconds, at least five seconds, or longer.

The inflator 24 may contain a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14 and maintaining the curtain in the inflated and deployed condition for a desired duration.

The apparatus 10 may include a housing 30 (shown in FIG. 1 only) that stores the inflatable curtain 14 in a deflated condition. The deflated inflatable curtain 14 and housing 30 have an elongated configuration and extend along the vehicle roof 18 and along the side structure 16 of the vehicle 12 above the side windows 20. The housing 30 may have a variety of constructions. For example, the housing 30 may comprise a fabric sheath or a plastic housing.

The inflatable curtain 14 may have any suitable construction. For example, as shown in FIG. 4, the inflatable curtain 14 may include panels 40 and 42 of material that are arranged in an overlying manner. Portions of the panels 40 and 42 are secured together. For example, the panels 40 and 42 may be secured together along at least a portion of a perimeter 48 (FIGS. 2 and 3) of the inflatable curtain 14 to form a perimeter connection 46 of the curtain. The perimeter connection 46 helps define an inflatable volume 50 of the inflatable curtain 14.

The inflatable curtain 14 may also include interior connections 52 (FIGS. 2-4) in which the overlying panels 40 and 42 are secured together within the perimeter 48 of the curtain. The interior connections 52 form non-inflatable portions of the inflatable curtain 14 within the perimeter 48 of the curtain. The perimeter connection 46 and interior connections 52 define side walls of inflatable chambers 54 of the inflatable curtain 14. The chambers 54 may include open end portions 66 defined between the side walls.

Figure 3:
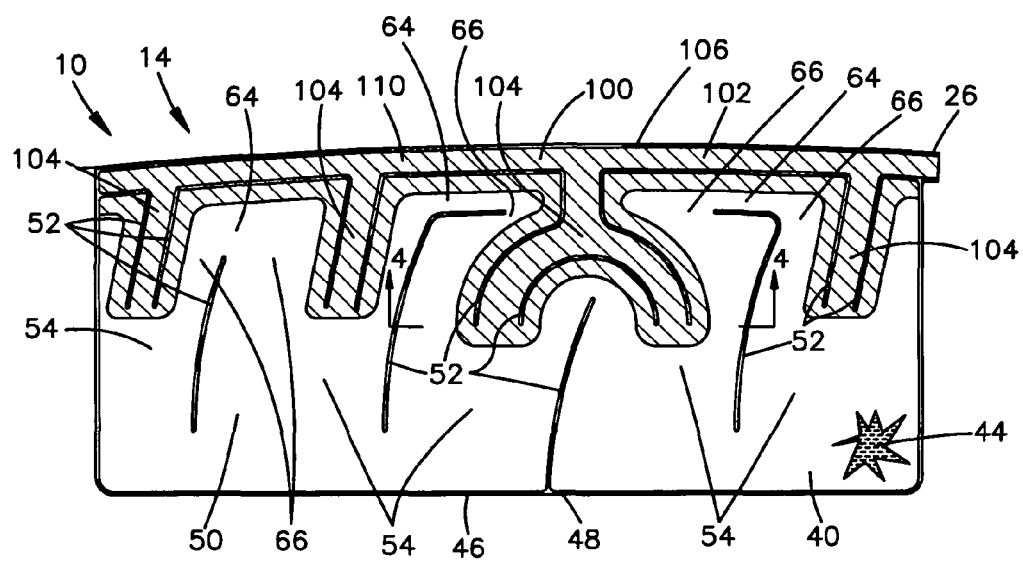
FIG. 3 is a plan view of a portion of the apparatus.
Figure 4:
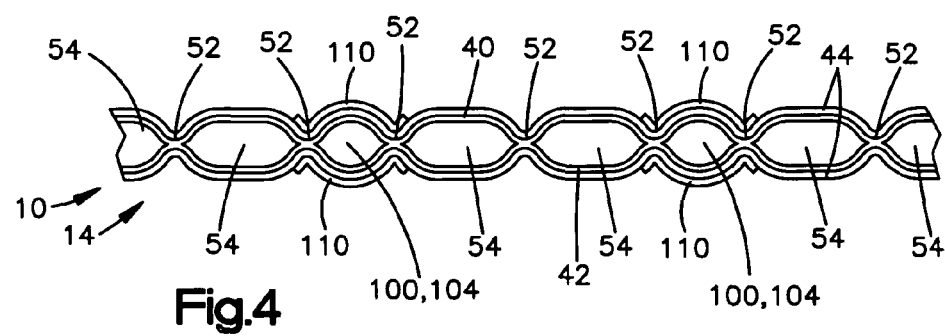
FIG. 4 is a sectional view of the apparatus taken generally along line 4-4 in FIG. 3.

The configuration of the interior connections 52 and chambers 54 illustrated in FIGS. 2 and 3 is one example configuration that may be selected for the inflatable curtain 14. Those skilled in the art will appreciate that the configuration of the interior connections 52, and thus the chambers 54, may vary depending on a variety of factors. For example, the configuration of the connections 52 and chambers 54 may vary depending on the architecture of the vehicle 12, the position of the inflatable curtain 14 in the vehicle, and the desired extent or coverage of the curtain in the vehicle.

The panels 40 and 42 may have a variety of constructions. For example, the panels 40 and 42 may be constructed of a woven fabric, such as one woven with nylon yarn or polyester yarn. A sealant 44 (FIGS. 2 and 3) may be applied to the panels 40 and 42 to give the inflatable curtain 14 a desired degree of gas permeability. For example, it may be desirable to provide the inflatable curtain 14 with a substantially gas impermeable construction. The sealant 44 may include, for example, a coating, such as a urethane or silicone coating. As another example, the sealant 44 may include a laminate, such as a plastic film laminate.

One particular example construction that may be used to produce the inflatable curtain 14 is a one piece woven construction. This construction is shown in FIGS. 2-4. In a one piece woven construction, the overlying panels 40 and 42 are woven simultaneously and all of the threads used to weave the panels 40 and 42 are woven as a single panel to form the perimeter connection 46 and interior connections 52. In this construction, the sealant 44 may be a coating or laminate applied to outer surfaces of the inflatable curtain 14.

According to the present invention, the inflatable curtain 14 is constructed to include a manifold 100 for distributing inflation fluid in the chambers 54 of the curtain. Certain interior connections 52 of the inflatable curtain 14 help define the manifold 100. The manifold 100 includes a plenum portion 102 and duct portions 104 that branch from the plenum portion. The plenum portion 102 is connected in fluid communication with the inflator 24 via the inlet portion 26 of the inflatable curtain 14.

The plenum portion 102 extends along the length of the inflatable curtain 14 adjacent an upper edge 106 of the curtain. As shown in FIGS. 3 and 4, the plenum portion 102 extends along the entire length of the inflatable curtain 14. The plenum portion 102 could, however, have a different extent, such as one extending from the inflator 24 to the duct portion 104 farthest from the inflator.

The duct portions 104 extend transversely from the plenum portion 102 into the chambers 54 of the inflatable curtain 14. Referring to FIGS. 2-4, the duct portions 104 may extend generally perpendicularly from the plenum portion 102 in a vertical or substantially vertical direction. Passages 64 are defined by clearances between the duct portions 104 and the open end portions 66 of the chambers. The passages 64 provide fluid communication between the chambers 54.

The vehicle 12 includes a sensor mechanism 60 (shown schematically in FIG. 1) for sensing the occurrence of an event for which inflation of the inflatable curtain 14 is desired, such as a side impact to the vehicle 12, a rollover of the vehicle, or both. Upon sensing such an event, the sensor mechanism 60 provides an electrical signal over lead wires 62 to the inflator 24. The electrical signal causes the inflator 24 to be actuated in a known manner.

The inflator 24 discharges fluid under pressure into the manifold 100. Inflation fluid flows through the plenum portion 102 and duct portions 104 into the inflatable volume 50 of the inflatable curtain 14. The housing 30 opens and the inflatable curtain 14 inflates and deploys in a direction away from the roof 18 in a downward direction as shown in FIGS. 1 and 2 and in a downward direction with respect to the direction of forward travel of the vehicle 12 into the inflated and deployed condition of FIG. 2. Inflation fluid may flow between the chambers 54 through the passages 64 defined by the clearances between the duct portions 104 and the open end portions 66 of the chambers.

The inflatable curtain 14, when inflated, extends along the side structure 16 of the vehicle 12 and is positioned between the side structure and any occupant of the vehicle. In the illustrated embodiment, the inflatable curtain 14 extends between the A pillar 80 of the vehicle 12 and a C pillar 84. The inflatable curtain 14, when inflated, may overlie portions of the A pillar 80, B pillar 82, C pillar 84, or a combination of these pillars. The interior connections 52, including those that help form the manifold 100, may help limit or otherwise control the inflated thickness of the inflatable curtain 14, as measured between the panels 40 and 42.

Those skilled in the art will appreciate that the inflatable curtain 14 may have an alternative configuration. For example, the inflatable curtain 14 could extend between the A pillar 80 and the B pillar 82 only or between the B pillar and the C pillar 84 only. As another example, in a vehicle (not shown) having a D-pillar, the inflatable curtain 14 could extend between the A pillar and the D pillar.

The manifold 100 may be configured such that the duct portions 104 distribute the inflation fluid into the inflatable chambers 54 so that the curtain 14 inflates and deploys in a desired manner. This may be achieved by selecting the flow areas of the duct portions 104 to help control the volumetric flow rate of inflation fluid to the chambers 54. The flow areas of the duct portions 104 for any given chamber 54 can be controlled through selection of the size (e.g., diameter) of the duct portions 104 delivering inflation fluid to the chamber, the number of duct portions delivering inflation fluid to the chamber, or both the size and number of duct portions delivering inflation fluid to the chamber.

For example, by configuring the duct portions 104 to help control the volumetric flow rate of inflation fluid into the chambers 54, the inflatable curtain 14 may be configured such that the chambers most likely to receive direct impact forces of an occupant are inflated and pressurized more rapidly than chambers less likely to receive direct impact forces of an occupant. For instance, in the embodiment illustrated in FIG. 2, chambers 54 identified at 56 are positioned directly adjacent the occupants and are thus most likely to receive direct impact forces of the occupants. In this instance, as shown in FIG. 2, the chambers 56 each have a dedicated duct portion 104, whereas the chambers 54 central to the curtain and not directly adjacent the occupants share a single duct portion that is branched and has a generally inverted Y-shape configuration.

Those skilled in the art will appreciate that the manifold 100, being exposed directly to the inflation fluid discharged from the inflator 24, may undergo relatively high stresses during inflation of the inflatable curtain 14. Accordingly, as shown in FIG. 3, a reinforcing layer 110 may be applied to the panels 40 and 42 of the inflatable curtain 14 in the area of the manifold 100 to help reinforce the manifold against stresses experienced during deployment of the curtain.

The reinforcing layer 110 may be constructed of any material or materials that are suited to help provide the desired reinforcement of the manifold 100. For example, the reinforcing layer 110 may comprise a coating, such as urethane coating that is applied by known means, such as spray coating or knife coating. As another example, the reinforcing layer 110 may comprise a laminate, such as a plastic film laminate or a metal foil laminate that is applied by known means, such as ultrasonic welding, heat bonding, or an adhesive. As another example, the reinforcing layer 110 may comprise a sheet of material applied to the panels 40 and 42 by suitable means, such as ultrasonic welding, heat bonding, stitching, and adhesives. Such as sheet may be constructed of a variety of materials, such as rubber, fabric (e.g., woven polyester), or a synthetic fiber material (e.g., Kevlar™ aramid fibers).

Figure 5A:
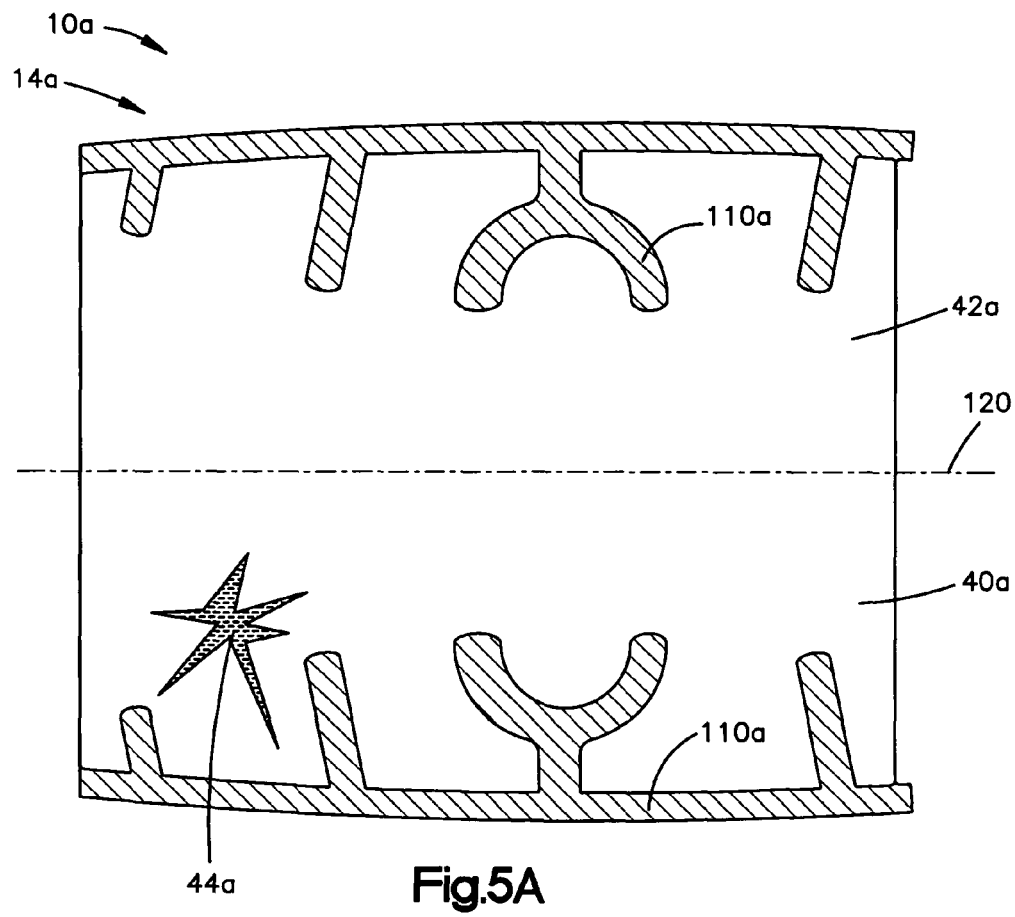
FIG. 5A is a schematic view illustrating a disassembled condition of an apparatus for helping to protect an occupant of a vehicle, according to a second embodiment of the present invention.
Figure 5B:
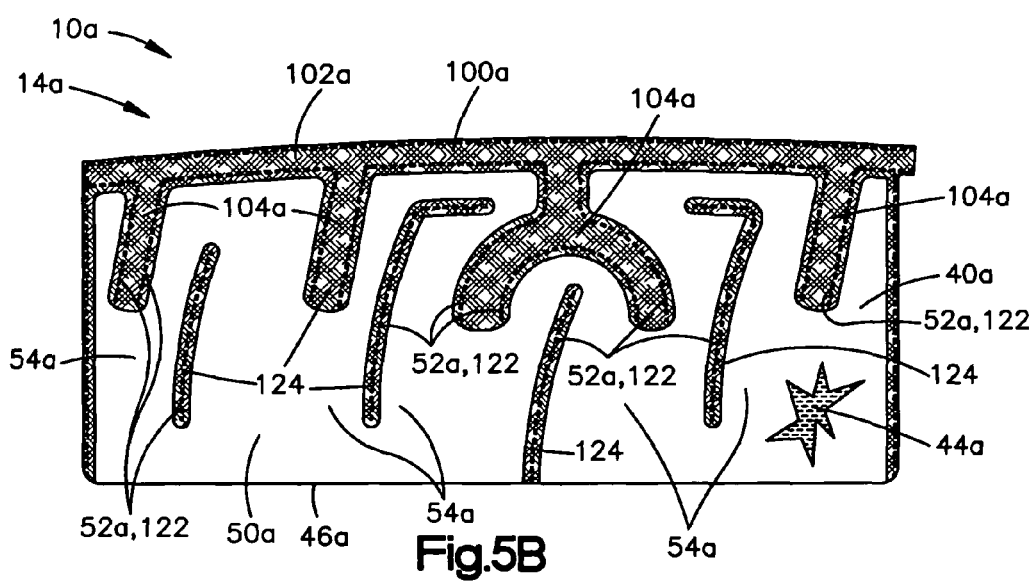
FIG. 5B is a schematic view illustrating an assembled condition of the apparatus of FIG. 5A.

A second embodiment of the present invention is illustrated in FIGS. 5A and 5B. The second embodiment of the invention is similar to the first embodiment of the invention illustrated in FIGS. 1-4. Accordingly, numerals similar to those of FIGS. 1-4 will be utilized in FIGS. 5A and 5B to identify similar components, the suffix letter "a" being associated with the numerals of FIGS. 5A and 5B to avoid confusion.

The apparatus 10a of FIGS. 5A and 5B illustrates another example of a construction that may be used to produce the inflatable curtain 14a. The inflatable curtain 14a includes panels 40a and 42a that are formed from woven fabric and subsequently interconnected to form the perimeter connection 46a and interior connections 52a. In this construction, the sealant 44a may be applied to inner surfaces of the panels 40a and 42a, as shown in FIG. 5A, to the outer surfaces of the panels, as shown in FIG. 5B, or to both the inner and outer surfaces of the panels.

In the embodiment of FIGS. 5A and 5B, the panels 40a and 42a are formed as a single sheet and folded over along a fold line 120 to position the panels overlying each other, as shown in FIG. 5B. Alternatively, the panels 40a and 42a could be formed as separate sheets and positioned overlying each other. The perimeter connection 46a and interior connections 52a may then be formed by suitable means, such as stitching, ultrasonic welding, heat bonding, adhesives, or a combination of these connection forming techniques. In the construction of the inflatable curtain 14a shown in the embodiment of FIGS. 5A and 5B, the perimeter connection 46a and interior connections 52a are formed by stitching 122. An additional sealant 124 may be applied to the inflatable curtain 14a in the areas of the stitching 122 to help prevent gas leakage through the connections 46a and 52a.

The manifold 100a and chambers 54a are formed when the panels 40a and 42a are interconnected via the connections 46a and 52a. As shown in FIG. 5B, the configuration of the manifold 100a and the configuration of the chambers 54a are substantially similar or identical to those of the embodiment of FIGS. 1-4. The manifold 100a, chambers 54a, or both the manifold and chambers could, however, have any desired configuration.

As shown in FIG. 5A, a reinforcing layer 110a may be applied to the panels 40a and 42a of the inflatable curtain 14a in the area of the panels that define the manifold to help reinforce the manifold against stresses experienced during deployment of the curtain. The configuration of the inflatable curtain 14a, in which the panels 40a and 42a are first formed and subsequently interconnected, allows the reinforcing layer 110a to be applied to the inner surfaces of the panels, the outer surfaces of the panels, or both the inner and outer surfaces of the panels.

As with the embodiment of FIGS. 1-4, the reinforcing layer 110a of the embodiment of FIGS. 5A and 5B may be constructed of any material or materials that are suited to help provide the desired reinforcement of the manifold 100a. For example, the reinforcing layer 110a may comprise a coating, such as urethane coating, that is applied by known means, such as spray coating or knife spreading. As another example, the reinforcing layer 110a may comprise a laminate, such as a plastic film laminate or a metal foil laminate, that is applied by known means, such as ultrasonic welding, heat bonding, or adhesives. As another example, the reinforcing layer 110a may comprise a sheet of material secured to the panels 40a and 42a by suitable means, such as ultrasonic welding, heat bonding, stitching, and adhesives. Such a sheet may be constructed of a variety of materials, such as rubber, fabric (e.g., woven polyester), or a high-strength synthetic fiber material (e.g., Kevlar™ aramid fibers). In the second embodiment, the stitching 122 could also be used to secure the reinforcing layer 110a to the panels 40a and 42a.

When the inflatable curtain 14a is inflated, inflation fluid flows through the plenum portion 102a and duct portions 104a into the inflatable volume 50a of the curtain. The duct portions 104a distribute the inflation fluid into the inflatable chambers 52a so that the curtain 14a inflates and deploys in a desired manner. This may be achieved by selecting the flow areas of the duct portions 104a to help control the volumetric flow rate of inflation fluid to the chambers 54a.

The flow areas of the duct portions 104a can be controlled through selection of the size of the duct portions 104a, the number of duct portions, or both the size and number of duct portions. This may be done, for example, to configure inflatable curtain 14a such that chambers 54a most likely to receive direct impact forces of an occupant are inflated and pressurized more rapidly than chambers less likely to receive direct impact forces of an occupant.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, said apparatus comprising:
   an inflatable vehicle occupant protection device inflatable to help protect an occupant of the vehicle, said protection device comprising overlying panels and a plurality of chambers at least partially defined by said overlying panels; and
   an inflation fluid source actuatable to provide inflation fluid for inflating said protection device;
   said protection device further comprising a manifold at least partially defined by said overlying panels, said manifold comprising a plenum portion for receiving inflation fluid from said inflation fluid source and duct portions that branch from said plenum portion and distribute inflation fluid into said chambers, wherein said chambers include side walls and an open end defined between said side walls, said duct portions extending through said open ends into said chambers;
   said chambers comprising at least a first chamber and a second chamber, one of said duct portions branches into first and second portions, said first portion distributing inflation fluid into said first chamber, said second portion distributing inflation fluid into said second chamber.

2. The apparatus recited in claim 1, wherein said duct portions extend into said chambers and terminate in said chambers.

3. The apparatus recited in claim 1, wherein there is a clearance between said duct portions and said open ends of said chambers, said clearance defining a passage for providing fluid communication between said chambers.

4. The apparatus recited in claim 3, wherein said passages permit inflation fluid flow between said chambers while inflation fluid is discharged from said manifold into said chambers via said duct portions.

5. The apparatus recited in claim 1, wherein said overlying panels are interconnected to help define said chambers.

6. The apparatus recited in claim 1, wherein said overlying panels are interconnected to help define said manifold.

7. The apparatus recited in claim 1, further comprising a material for reinforcing said overlying panels.

8. The apparatus recited in claim 7, wherein said reinforcing material only covers areas of said panels that define said manifold, areas of said panels that define said chambers being substantially free from said reinforcing material.

9. The apparatus recited in claim 8, wherein said reinforcing material for reinforcing said overlying panels comprises a coating.

10. The apparatus recited in claim 8, wherein said material for reinforcing said overlying panels comprises a laminate.

11. The apparatus recited in claim 10, wherein said laminate comprises at least one of a plastic film and a metal foil.

12. The apparatus recited in claim 1, wherein said overlying panels are constructed with multiple layers of material, said materials being selected from the group comprising fabrics, plastic films, metal foil layers, plastics, and rubber.

13. The apparatus recited in claim 1, wherein said overlying panels are woven simultaneously and threads used to weave the panels are woven as a single panel at certain locations to help define said chambers and said manifold.

14. The apparatus recited in claim 1, wherein said overlying panels are interconnected by stitching that helps define said chambers and said manifold.

15. The apparatus recited in claim 1, wherein said overlying panels interconnected by one of ultrasonic welding, heat bonding, and adhesives to help define said chambers and said manifold.

16. The apparatus recited in claim 1, wherein said inflatable vehicle occupant protection device comprises an inflatable curtain inflatable away from a roof of the vehicle between a side structure of the vehicle and a vehicle occupant.

17. The apparatus recited in claim 1, wherein said plenum portion extends along the length of the protection device and said duct portions extend transverse to said plenum portion into said chambers.

18. The apparatus recited in claim 17, wherein said duct portions extend substantially vertically into said chambers.

19. The apparatus recited in claim 1, wherein said manifold helps control the inflated thickness of said protection device.

20. An apparatus for helping to protect an occupant of a vehicle, said apparatus comprising:
    an inflatable vehicle occupant protection device inflatable to help protect an occupant of the vehicle; and
    an inflation fluid source actuatable to provide inflation fluid for inflating said protection device;
    said protection device comprising inflatable chambers and a manifold for delivering inflation fluid to said inflatable chambers, said manifold comprising a plenum portion for receiving inflation fluid from said inflation source and duct portions that branch from said plenum portion and distribute inflation fluid into said chambers; and
    a substantially gas impermeable material for reinforcing said manifold, said reinforcing material covering the entire manifold, areas of said chambers being substantially free from said reinforcing material.

21. An apparatus for helping to protect an occupant of a vehicle, said apparatus comprising:
    an inflatable vehicle occupant protection device inflatable to help protect an occupant of the vehicle; and
    an inflation fluid source actuatable to provide inflation fluid for inflating said protection device;
    said protection device comprising inflatable chambers and a manifold for delivering inflation fluid to said inflatable chambers, said manifold comprising a plenum portion positioned outside said chambers and duct portions that branch from said plenum portion and extend into said chambers, a reinforcing material being applied to the entire manifold to reinforce said manifold against stresses experienced during deployment of said inflatable occupant protection device.

22. The apparatus recited in claim 21, wherein said protection device comprises overlying panels and connections that interconnect said panels to define said chambers and said manifold.

23. The apparatus recited in claim 22, wherein said connections defining said chambers and said manifold help limit the distance between said overlying panels when said protection device is inflated.

24. The apparatus recited in claim 21, wherein said plenum portion extends along the length of the protection device and said duct portions extend transverse to said plenum portion into said chambers.

25. The apparatus recited in claim 21, wherein said duct portions extend substantially vertically into said chambers.

* * * * *